US005892455A

United States Patent [19]

Matsumoto

[11] Patent Number: 5,892,455

[45] **Date of Patent: *Apr. 6, 1999**

[54] ANALOG WRIST WATCH AND PAGER PROVIDING MESSAGE DISPLAY ON COVER GLASS

[75] Inventor: Mariko Matsumoto, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 507,586

[22] Filed: Jul. 26, 1995

[30] Foreign Application Priority Data

Jul. 26, 1994 [JP] Japan .................................... 6-193754

[51] Int. Cl.[6] ........................................................ H04Q 7/18

[52] U.S. Cl. ........................ 340/825.44; 368/10; 368/242; 340/311.1; 455/344; 468/896; 345/5; 370/314

[58] Field of Search ................................ 368/10, 47, 228, 368/80, 242; 340/825.44, 825.47, 311.1; 455/344; 968/896; 345/4, 5, 117; 370/314

[56] References Cited

U.S. PATENT DOCUMENTS

| | | | |
|---|---|---|---|
| 4,371,870 | 2/1983 | Biferno | 345/4 |
| 5,185,604 | 2/1993 | Nepple et al. . | |
| 5,479,378 | 12/1995 | Yamada et al. | 368/10 |
| 5,552,779 | 9/1996 | Gaskill et al. | 340/825.44 |
| 5,572,196 | 11/1996 | Sakumoto et al. | 340/825.44 |

FOREIGN PATENT DOCUMENTS

| | | |
|---|---|---|
| 63-68230 | 5/1988 | Japan . |
| 2-35094 | 3/1990 | Japan . |
| 4-19038 | 2/1992 | Japan . |

*Primary Examiner*—Brian Zimmerman
*Assistant Examiner*—William H. Wilson, Jr.
*Attorney, Agent, or Firm*—Scully, Scott, Murphy & Presser

[57] ABSTRACT

An LCD is integrated with the cover glass of a wrist watch radio paging receiver which indicates the time data with a dial plate and hands, and a message is displayed on the cover glass by controlling this LCD. In this message display, the parts of the characters indicating the message are made transparent and the remaining parts intercept light. In this manner, message display is made possible by the difference in light transmissivity.

13 Claims, 6 Drawing Sheets

ANALOG WRIST WATCH AND PAGER PROVIDING MESSAGE DISPLAY ON COVER GLASS

BACKGROUND OF THE INVENTION

1. Field of the Invention

The present invention relates to a message indicating unit and its method, and more particularly to a message indicating unit and its method for use in a wrist watch type radio paging receiver.

2. Description of the Related Art

Along with the spreading use of radio paging receivers, radio paging receivers integrated with wrist watches are proposed. As wrist watch type paging receivers of this kind, paging receivers each having a liquid crystal display screen are described, for instance, in the U.S. Pat. No. 5,185,604 and the Gazette of the Japanese Utility Model Laid-open No. 1988-68230(JP-U-63-68230). In these paging receivers, the received message is indicated in the liquid crystal display screen for indicating the time data. If the user likes digital wrist watches which indicate the time data in a digital form, there will be no problem. However, if the user likes analog wrist watches which indicate the time data with a long hand and a short hand, he or she would not use such a paging receiver.

An analog watch type radio paging receiver having a message displaying function is described, for example, in the Gazette of the Japanese Utility Model. Laid-open No. 1992-19038(JP-U-4-19038). This paging receiver is positioned elsewhere than the dial plate, for instance on the wrist band. Therefore, if the user is to look at the received message display, he or she will have to incline the wrist watch into a position different from the usual position for looking at the time data. Another radio paging receiver having a liquid crystal display section on the dial plate is described, for example in the Gazette of the Japanese Utility Model No. 1990-35094(JP-U-2-35094). In this paging receiver, the liquid crystal unit is arranged on the back side of a part of the dial plate and configured as message display screen, whose area accordingly cannot be expanded beyond a certain limit. As a result, the message is indicated in very small characters, too small to be readily read or unreadable if one of the watch hands overlaps them. Furthermore, arranging the message display screen in a part of the dial plate, the design of the watch as such may be affected, and accordingly a paging receiver cannot be readily integrated with a wrist watch of a prestige-oriented design.

SUMMARY OF THE INVENTION

An object of the present invention is to provide a message indicating unit and its method for use in a wrist watch type radio paging receiver, wherein the message display area is maximized to make the message readily readable.

Another object of the invention is to provide a message indicating unit and its method for use in a wrist watch type radio paging receiver, enabling the dial plate as it is to display a message.

A message indicating unit for use in a wrist watch type radio paging receiver according to the invention has a dial plate for indicating the time data with hands, a cover glass arranged over the dial plate, and a message display circuit, integrated with the cover glass, for displaying a message. This message indicating unit may further have a receiver circuit for receiving a message and a memory circuit for memorizing the message received by the receiver circuit and supplying it to the message display circuit.

The message display circuit is a liquid crystal display (LCD) provided with liquid crystals, and a first electrode and a second electrode between which the liquid crystals are sandwiched, the first electrode being stuck to the cover glass and the message display circuit being caused to display a message by supplying power to the first and second electrodes. The message display circuit should preferably be structured so that, when a message is displayed, the parts of the LCD indicating the message characters be made transparent and the remaining parts intercept light or vice versa.

The message display unit may usually display the time data on the dial plate and, when a message is received, the time data may be replaced by the message.

By a method according to the invention for controlling message indication in a wrist watch type radio paging receiver, a message is received, memorized, and displayed on the cover glass of the wrist watch type radio paging receiver. When a message is displayed, power is supplied to the LCD provided on the cover glass.

By the method according to the invention for controlling message indication in a wrist watch type radio paging receiver, the LCD is made transmissive all over, a message is received and displayed on the LCD and, after the display of the message, the LCD is again made transmissive all over. When a message is displayed, the parts of the LCD indicating the message characters are made transparent and the remaining parts intercept light or vice versa. The time data in numerals may usually be displayed and, when a message is received, the numerals may be replaced by the message.

According to the invention, as the message indicating unit and its method are designed to display the message on the cover glass, the visibility of the message is not affected by the hands of the watch. Furthermore, as the watch is no different from any analog watch when no message is displayed, the message display screen does not affect time data indication by the watch.

The time data indicated by the hands may usually be displayed in numerals and, when a message is received, the numerals may be replaced by the message.

BRIEF DESCRIPTION OF THE DRAWINGS

These and other objects, features and advantages of the present invention will become more fully apparent from the following detailed description when taken in conjunction with the accompanying drawings, wherein.

In the drawings, the same reference numerals denote the same structural elements.

DESCRIPTION OF THE PREFERRED EMBODIMENTS

Figure 1:
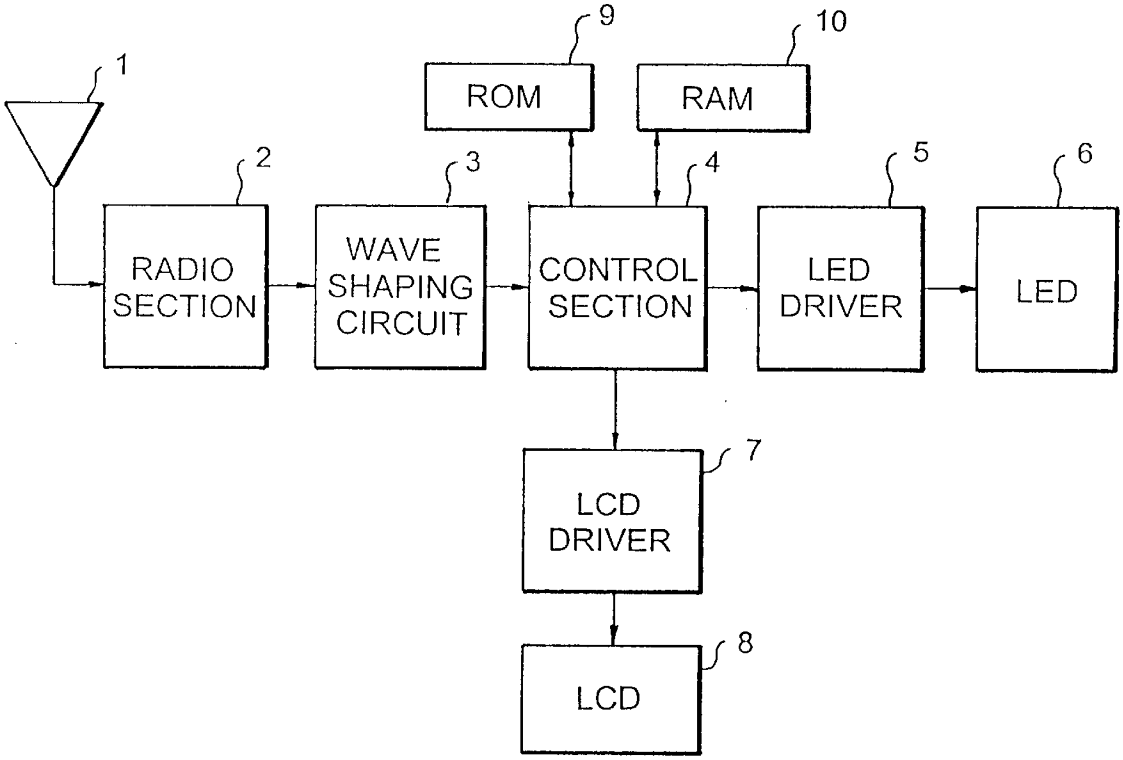
FIG. 1 is a block diagram illustrating a preferred embodiment of the invention.

FIG. 1 is a block diagram illustrating a preferred embodiment of the present invention.

In FIG. 1, a radio paging receiver, for instance a pager, has an antenna 1, a radio section 2, a wave shaping circuit 3, a control section 4, a light emitting diode (LED) drive circuit 5, an LED 6, a liquid crystal display (LCD) driver 7, an LCD 8, a read only memory (ROM) 9, and a random access memory (RAM) 10. The radio section 2 receives a paging signal from a base station (not shown) via the antenna 1, amplifies and demodulates the received paging signal, and supplies the demodulated signal to the wave shaping circuit 3. The wave shaping circuit 3 subjects the demodulated signal to wave shaping, and supplies the wave-shaped digital signal to the control section 4, which preferably consists of a single-chip integrated circuit (IC).

The control section 4 decodes the wave-shaped digital signal, and extracts a call signal and/or a message signal from the decoded digital signal. The extracted call signal, i.e. the call signal contained in the paging signal, is compared within the control section 4 with a call signal stored in advance in the ROM 9. If the extracted call signal is found identical with the call signal in the ROM 9, the control section 4 will execute notification control.

In its notification control, the control section 4 drives the LED drive circuit 5 to cause the LED 6 to emit light. The control section 4 also stores the extracted message into the RAM 10. After that, the control section 4 drives the LCD driver 7 to display the stored message on the LCD 8. In the notification control process so far described, a loudspeaker may be substituted for the LED and caused to sound instead of emitting light, or both may be provided.

Figure 2A:
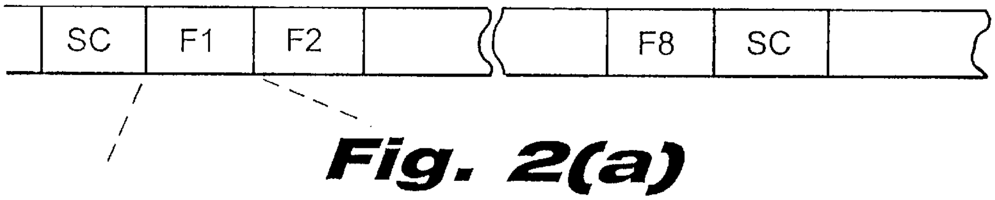
Fig. 2(a) Prior Art
FIGS. 2(*a*) and 2(*b*) illustrate a format of a paging signal.
Figure 2B:
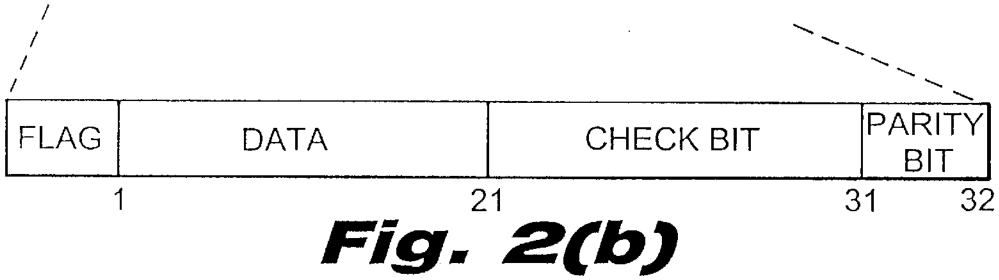
Fig. 2(b) Prior Art

FIGS. 2(*a*) and (*b*) illustrate a format of the paging signal. Here are shown as an example a signal format according to the POCSAG standard. In FIG. 2(*a*), the paging signal consists of a synchronization code SC and a plurality of frames F1 through F8, and each frame comprises two code words. FIG. 2(*b*) shows one code word. Each cord word consists of 32 bits including 1 flag, 20 data bits. 10 check bits, and 1 parity bit, The ID bit is used to discriminate whether the data following it are address information or message information. If, for example, the flag is "0", the data are address information or, if it is "1", the data are message information.

Figure 3A:
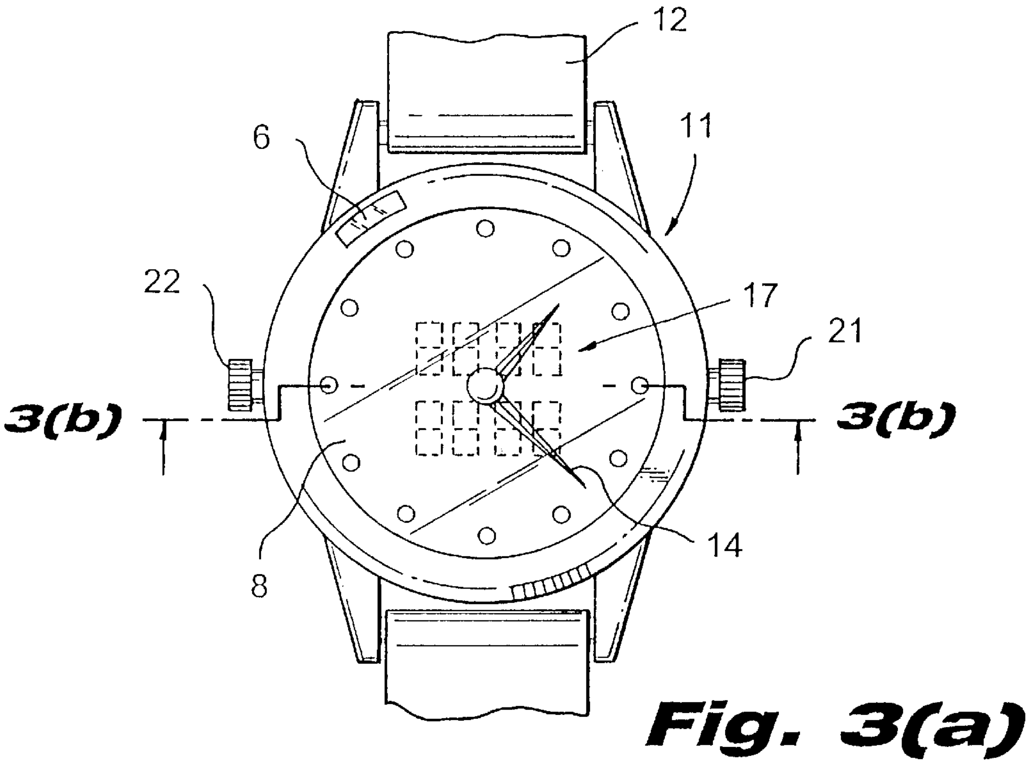
FIGS. 3(*a*) and 3(*b*) show respectively an external plan of the invention and the A—A cross section of FIG. 3(*a*)
Figure 3B:
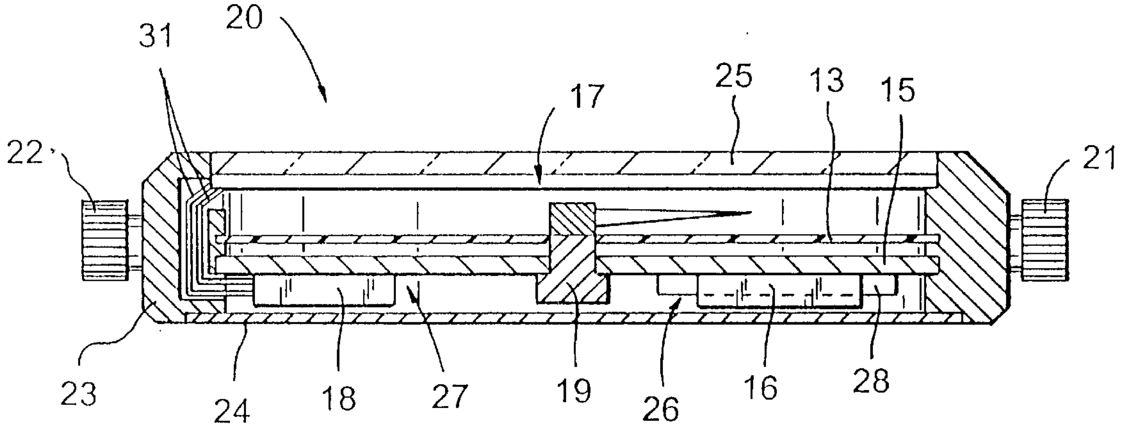

FIG. 3(*a*) shows an external plan of a wrist watch type radio paging receiver according to the invention, and FIG. 3(*b*) shows the A-A cross section of FIG. 3 (*a*).

In FIGS. 3(*a*) and (*b*), the wrist watch type radio paging receiver comprises a body 11 and a wrist band 12 connected to this body 11. The body 11 further comprises a case 20, a watch mechanism 26 and a receiver assembly 27. These watch mechanism 26 and receiver assembly 27 are housed in the case 20, which in turn consists of a case body 23, a back lid 24 and a cover glass 25. On an inclined part of the case body 23 is provided the LED 6.

The watch mechanism 26 has a battery 28, a watch circuit 16 and a watch hand drive mechanism 19 on a circuit substrate 15 built into the case 20, and a dial plate 13 and watch hands 14 over the circuit substrate 15. The battery 28 supplies power to the watch circuit 16, which drives the watch hand drive mechanism 19. The watch hand drive mechanism 19 drives the watch hands 14. A stem 21 is mainly used for adjusting the watch hands 14. The watch mechanism 26 is configured in this manner as an analog type watch.

The receiver assembly 27 consists of a receiver circuit 18, provided on the back side of the circuit substrate 15, and a message display section 17. The receiver circuit 18 has the radio section 2, the wave shaping circuit 3, the control section 4, the LED drive circuit 5, the LCD driver 7, the ROM 9, and the RAM 10 shown in FIG. 1. The message display section 17 comprises the cover glass 25 and the LCD 8, the ends of which are connected to the receiver circuit 15 by lead wires 31. Each of these lead wires is connected to one segment in a matrix form. The ends of the matrix LCD may use a multiplex drive method by which a number of display electrodes are put together and driven on a time sharing basis in order to reduce the number of lead wires. A twisted nematic LCD may as well be used instead of this kind of matrix LCD.

The switch 22 is used to control message display, light emission stop of the LED or the like by turning or pressing. The battery 28 supplies power to the receiver circuit 18, too.

As illustrated in FIG. 3(*a*), a message is displayed on the cover glass as indicated by waved lines. This message display will be described in detail below.

Figure 4:
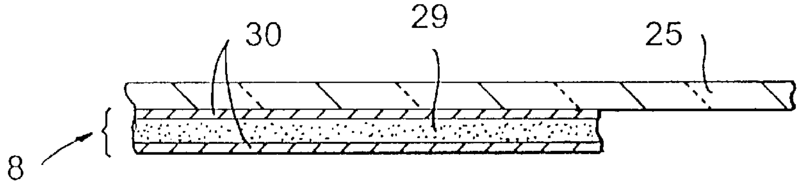
FIG. 4 shows an expanded cross section of the message display section illustrated in FIG. 3(*b*)

FIG. 4 shows an expanded cross section of the message display section 17 illustrated in FIG. 3(*b*).

In FIG. 4, the LCD 8, stuck to the inside face of the cover glass 25, consists of two transparent electrodes 30 and liquid crystals 29 sandwiched between these electrodes. One of the electrodes 30 is fitted to the cover glass 25. Preferably, this electrode 30 is arranged in a rectangular area in approximately the central position of the circular cover glass 25. In the embodiment illustrated in FIG. 1, display segments are configured so as to be able to display eight characters consisting of two rows of four-character lines. To ends of these transparent electrodes 30 are connected the lead wires 31 as stated above. The LCD may be provided over the whole area, instead of part, of the underside of the cover glass.

Figure 5:
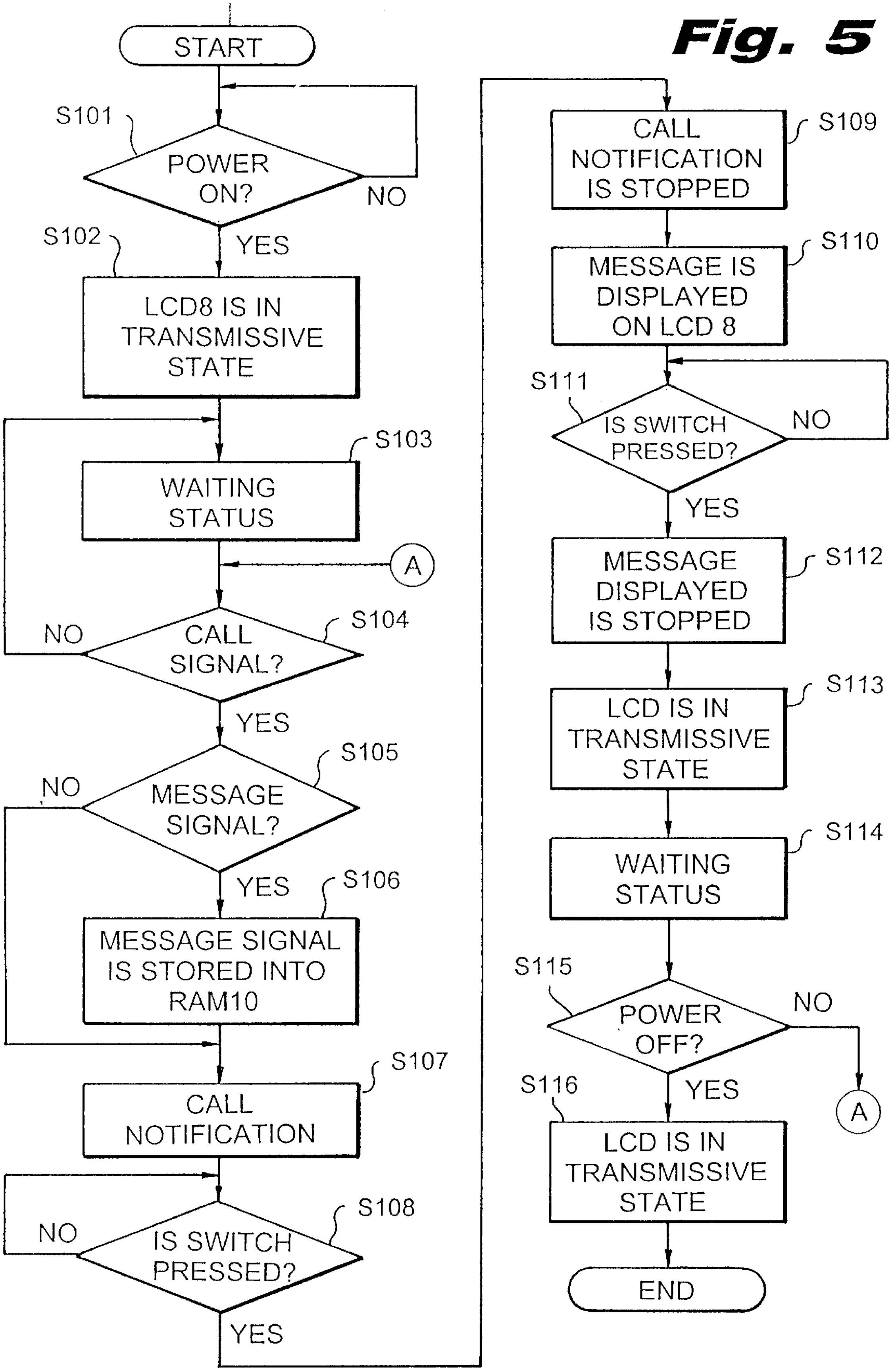
FIG. 5 is a flow chart for describing the operation of the invention.

FIG. 5 is a flow chart for describing the operation of the present invention.

Referring to FIG. 5, when the power supply to the paging receiver is turned on by operating the switch 22 (step S101), the receiver circuit 18 initializes the power supply to the message display section 17. This causes the message display section 17 to place the LCD 8 in a wholly transmissive state (step S102). In this state of power supply, as the LCD 8 is transmissive all over, the message display section 17 is transparent. Therefore, the user can read the dial plate 13 and the watch hands 14 through the cover glass 25, and the paging receiver functions as an ordinary watch. Then, the paging receiver is placed in a state of waiting for a call signal (step S103).

When the paging receiver in its waiting status receives the call number assigned to it (step S104), it is judged whether or not the call signal contains a message signal (step S105). If there is a message signal in the call signal, it is stored into the RAM 10 (step S106). After that, a call notification is executed (step S107) by having the LED 6 emit light. Or if there is no message signal, a call notification is executed after detecting the call number.

If the switch 22 is pressed down during a call notification (step S108), the call notification is stopped (step S109). If the call signal contains no message signal, reception processing is completed. Or if a message signal is contained, the message is displayed on the LCD 8 (step S110). If the switch 22 is pressed down during a message display (step S111), the message display is completed (step S112). Then the LCD 8 is made transmissive all over (step S113), and shifts to its waiting status (step S114). If, in the waiting status, the switch is turned in the reverse direction to turn off the power supply (step S115), the LCD 8 is made transmissive all over (step S116).

In step S110, a sign indicating a call reception may be displayed together with the call notification in step S107 when no message signal is contained.

The message indicating method according to the present invention will be described below.

Figure 6A:
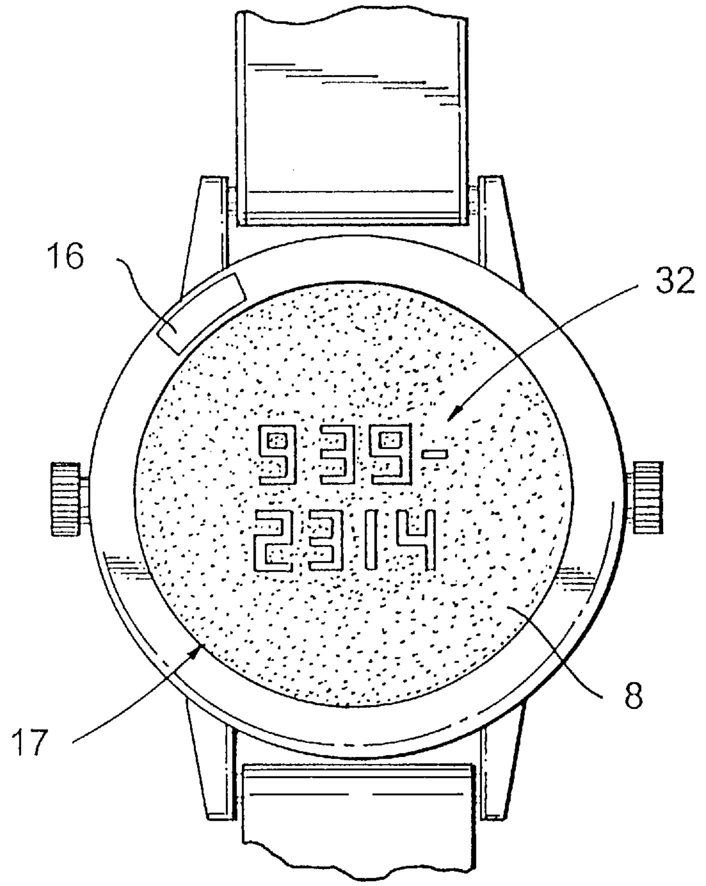
FIGS. 6(*a*) and 6(*b*) are respectively an external plan and a cross-sectional diagram illustrating a preferred example of the indicating method according to the invention.
Figure 6B:
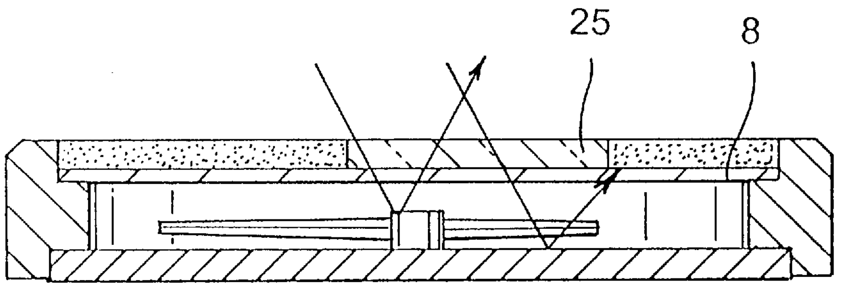

FIGS. 6(*a*) and (*b*) are respectively an external plan and a cross-sectional diagram illustrating a preferred example of the indicating method according to the present invention.

In the diagrams, all other parts than message indicating characters 32 intercept light, while the parts of the message indicating characters 32 transmit light. The LCD 8 is controlled to be placed in such a state. Thus, the receiver circuit 18 supplies a rectangular wave to the electrodes 30 via the lead wires 31 so that this control can be accomplished. As the parts of the message indicating characters 32 allow perception of the color of the dial plate 13 through the cover glass 25, the user is enabled to read the message indicating characters 32 in the color of this dial plate 13. In this case, as the dial plate 13 and the watch hands 14 are exposed in the message indicating characters 32 through the transparent parts, it is preferable to design the dial plate in a light color and the watch hands 14 in a color close to that of the dial plate 13 or in a thin needle shape.

In the above-described embodiment, the whole cover glass can be composed as message displaying section by arranging the LCD over the whole area of the inside face of the cover glass. This would not adversely affect the readability of the message indicating characters. Nor would the clock hands 14 make the message less readable because the message display takes place over the dial plate 13 and the clock hands 14. Furthermore, when no message is displayed, as the cover glass is kept transparent, the watch is no different from any ordinary watch. Any prestige-oriented design of the watch would be affected.

Figure 7A:
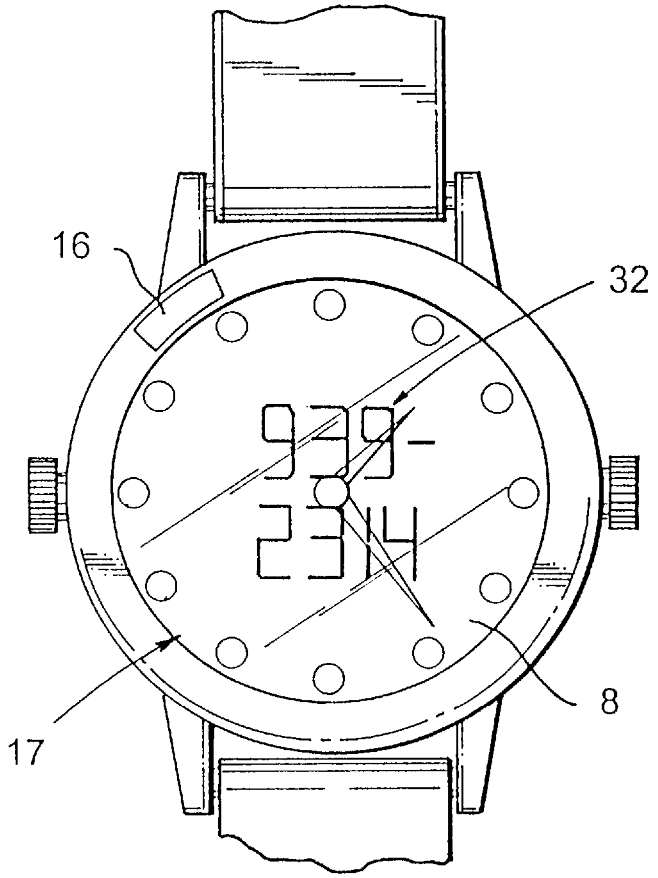
FIGS. 7(*a*) and 7(*b*) are respectively an external plan and a cross-sectional 7 diagram illustrating another preferred example of the indicating method according to the invention.
Figure 7B:
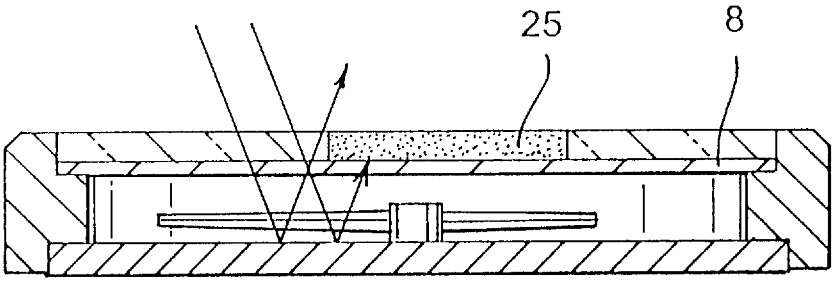

FIGS. 7(*a*) and (*b*) are respectively an external plan and a cross-sectional diagram illustrating another preferred example of the indicating method according to the present invention.

Referring to the diagrams, when a message is displayed, it is also possible to have the message indicating characters 32 in black over the dial plate 13 by having the parts of the message indicating characters 32 intercept light. In this case, it is preferable to design the dial plate in a light color and the watch hands 14 in a thin shape, because the message indicating characters 32 are more readable if they are in sharper contrast to the dial plate 13 and the watch hands 14.

Figure 8A:
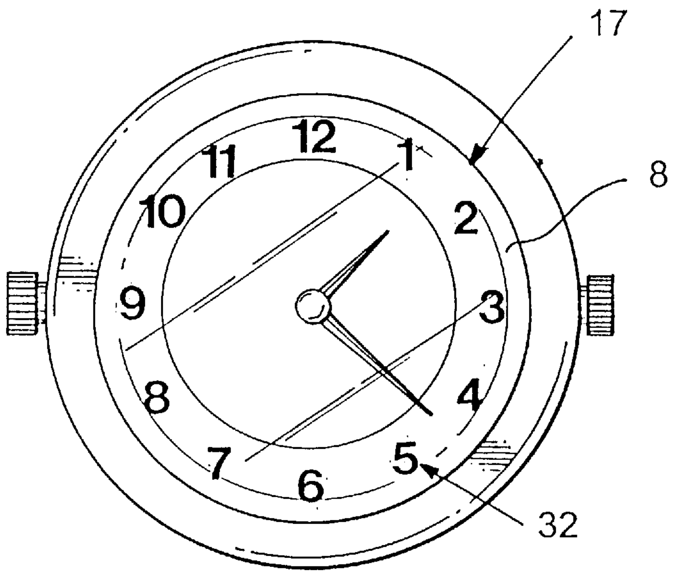
FIGS. 8(*a*) and 8(*b*) are external plans illustrating another preferred example of the indicating section according to the invention.
Figure 8B:
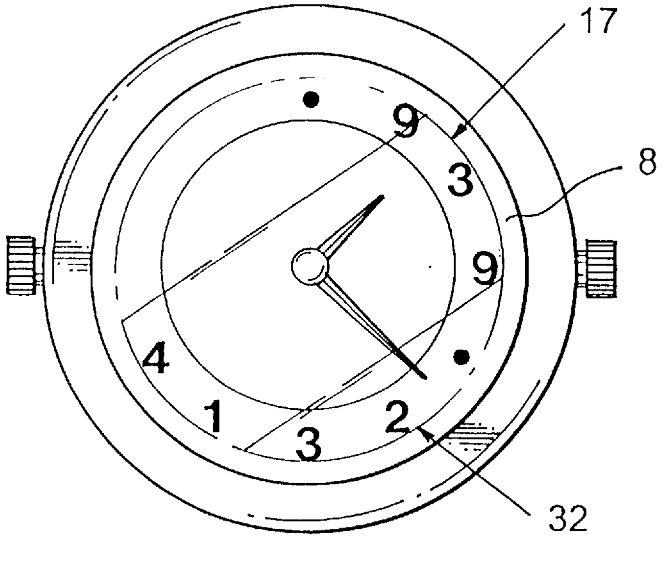

While the message indicating characters are arranged in rows of horizontal lines in the above-described embodiment, the message display section 17 may as well be formed as illustrated in FIG. 8(*a*) by arranging the LCD 8 along the chapters of the watch, i.e. along the circumference of the cover glass 25. In this case, as shown in FIG. 8(*b*), the message indicating characters 32 can be displayed in the message display section along the circumference. For instance, usually the chapters of the watch are displayed in the message display section 17 as in FIG. 8(*a*), while the message, whenever it is to be displayed, can be displayed in message indicating characters 32 as in FIG. 8(*b*).

Although the above-described embodiment uses a circular shaped wrist watch type radio paging receiver, its shape may as well be rectangular.

As hitherto described, according to the present invention, the message indicating unit and its method are designed to display a message on the cover glass, the message can be displayed without been obstructed by the clock hands. Furthermore, at other times than when a message is displayed, the paging receiver is nothing but an ordinary watch, and its message display section never affects time indication by the watch.

Or, the display section can as well be configured so as to display numerals to be pointed by the watch hands at usual times and replace the numerals with a message whenever a message is to be displayed.

As described in the foregoing paragraphs, according to the invention, the message display section is structured by providing an LCD integrated with the cover glass of the analog type wrist watch and having this message display section display the message on the cover glass surface. Therefore, the whole area of the cover glass can be configured as message display section, so that the message indicating characters can be made large enough to ensure the readability of the message. When no message is displayed, the cover glass is no different from the cover glass of any ordinary watch, so that the design of the watch is never affected, making the paging receiver compatible especially with watches of prestige-oriented designs.

The message display section can display message indicating characters by utilizing a difference in light transmissivity, i.e. by making, when a message is displayed, the parts of the LCD indicating the message characters transparent and having the remaining parts intercept light or vice versa.

Furthermore, as the LCD is integrated with the inside face of the cover glass in the message display section, this section and the cover glass can be treated as a single solid unit to prevent the number of parts to constitute the paging receiver from increasing and thereby to facilitate its assembly and maintenance.

Particularly, the message display section according to the invention can provide a fanciful way of message display by displaying the chapters of the watch at normal times and replacing the numerals with a message whenever a message is to be displayed.

While the invention has been described with reference to a specific embodiment thereof, it will be appreciated by those skilled in the art that numerous variations, modifications and embodiments are possible and, accordingly, all such variations, modifications and embodiments as being within the spirit and scope of the invention.

What is claimed is:

1. A message indicating unit for use in a wrist watch radio paging receiver comprising:

time data indicating means for indicating the time data with hands, a cover glass arranged over said time data indicating means, and message display means, integrated with said cover glass, for displaying a message, the message display means being transparent when the message is not being displayed so as not to obstruct the visibility of the time data indicating means.

2. A message indicating unit, as claimed in claim 1, further comprising:

receiver means for receiving said message and memory means for memorizing the message received by said receiver means and supplying it to said message display means.

3. A message indicating unit, as claimed in claim 1, wherein said message display means is a liquid crystal display (LCD).

4. A message indicating unit, as claimed in claim 3, wherein said LCD comprises:

liquid crystals, and a first electrode and a second electrode between which said liquid crystals are sandwiched, said first electrode being fastened to said cover glass and said message display means being caused to display said message by supplying power to said first and second electrodes.

5. A message indicating unit, as claimed in claim 4, wherein said message display means makes, when a message is displayed, the parts of the LCD indicating the message characters transparent and have the remaining parts intercept light or vice versa.

6. A message indicating unit, as claimed in claim 1, wherein the shape of said time data indicating means is circular.

7. A message indicating unit, as claimed in claim 1, wherein the shape of said message indicating means is rectangular.

8. A method for controlling message indication in a wrist watch radio paging receiver comprising the steps of:

receiving a message, memorizing said message, and displaying said message on a display means integrated with a cover glass of said wrist watch type radio receiver, said message display means being transparent when said message is not being displayed so as not to obstruct the visibility of a time data indicating means.

9. A control method, as claimed in claim 8, further comprising:

supplying power to an LCD provided on said cover glass when a message is displayed.

10. A method for controlling message indication in a wrist watch radio paging receiver, comprising the steps of:

rendering an LCD transmissive all over, receiving a message, the message, being composed of characters, displaying said message on said LCD, and rendering said LCD again transmissive all over after the display of said message.

11. A control method, as claimed in claim 10, further comprising:

when said message is displayed, the parts indicating the characters of said message are made transparent and the remaining parts intercept light or vice versa.

12. A control method, as claimed in claim 10, further comprising:

displaying numerals on the LCD for indicating time data, replacing said numerals with said message when said message is to be indicated, and replacing said message with said numerals after the message has been indicated.

13. A message indicating unit for use in a wrist watch radio paging receiver comprising:

time data indication means for indicating the time data with hands, message display means positioned circumferentially about the time data indication means, said message display means displays time data numerals for use with said time indication means when no message is to be displayed and is replaced by display of a message when said message is received.

* * * * *